United States Patent Office 3,605,336
Patented Sept. 20, 1971

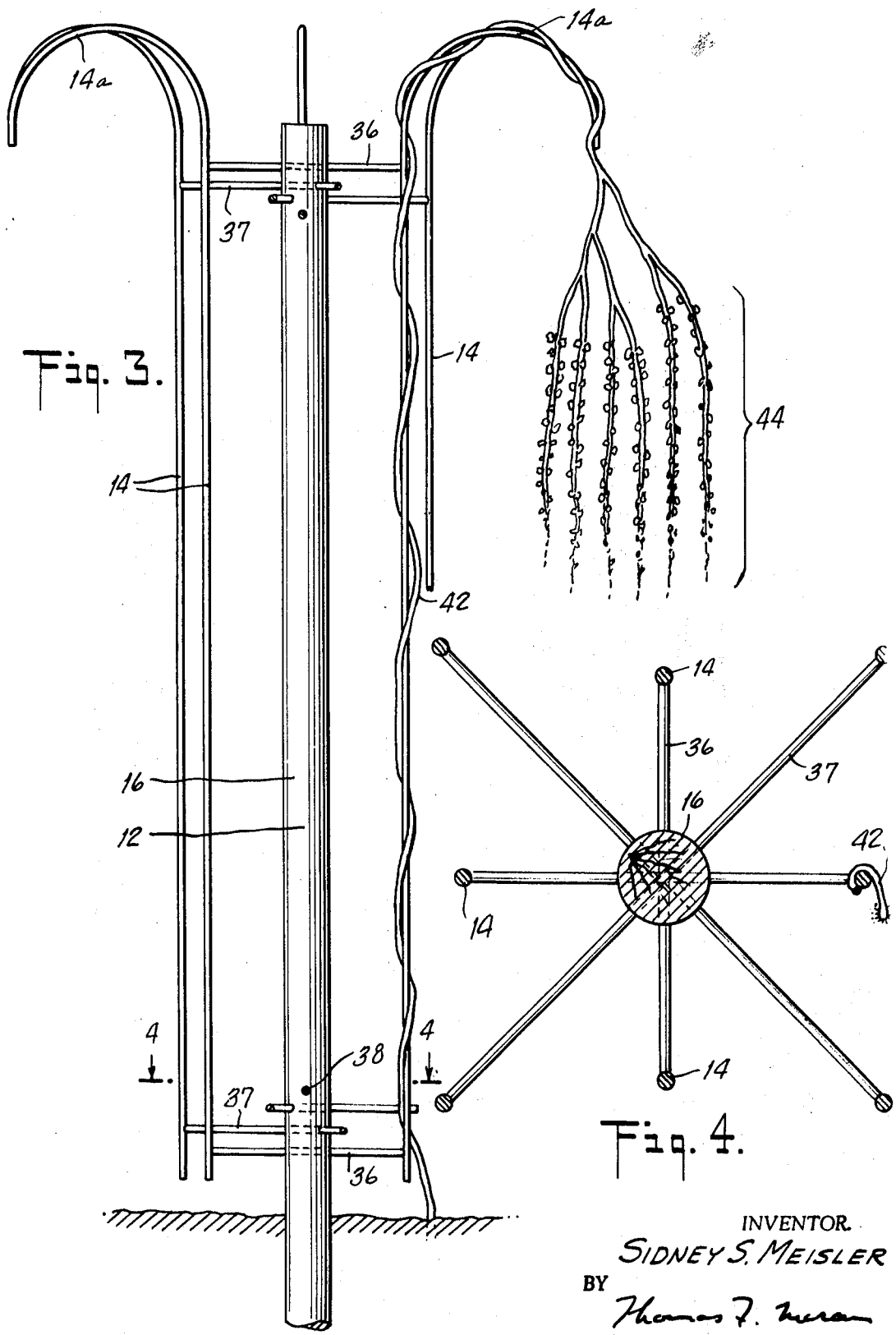

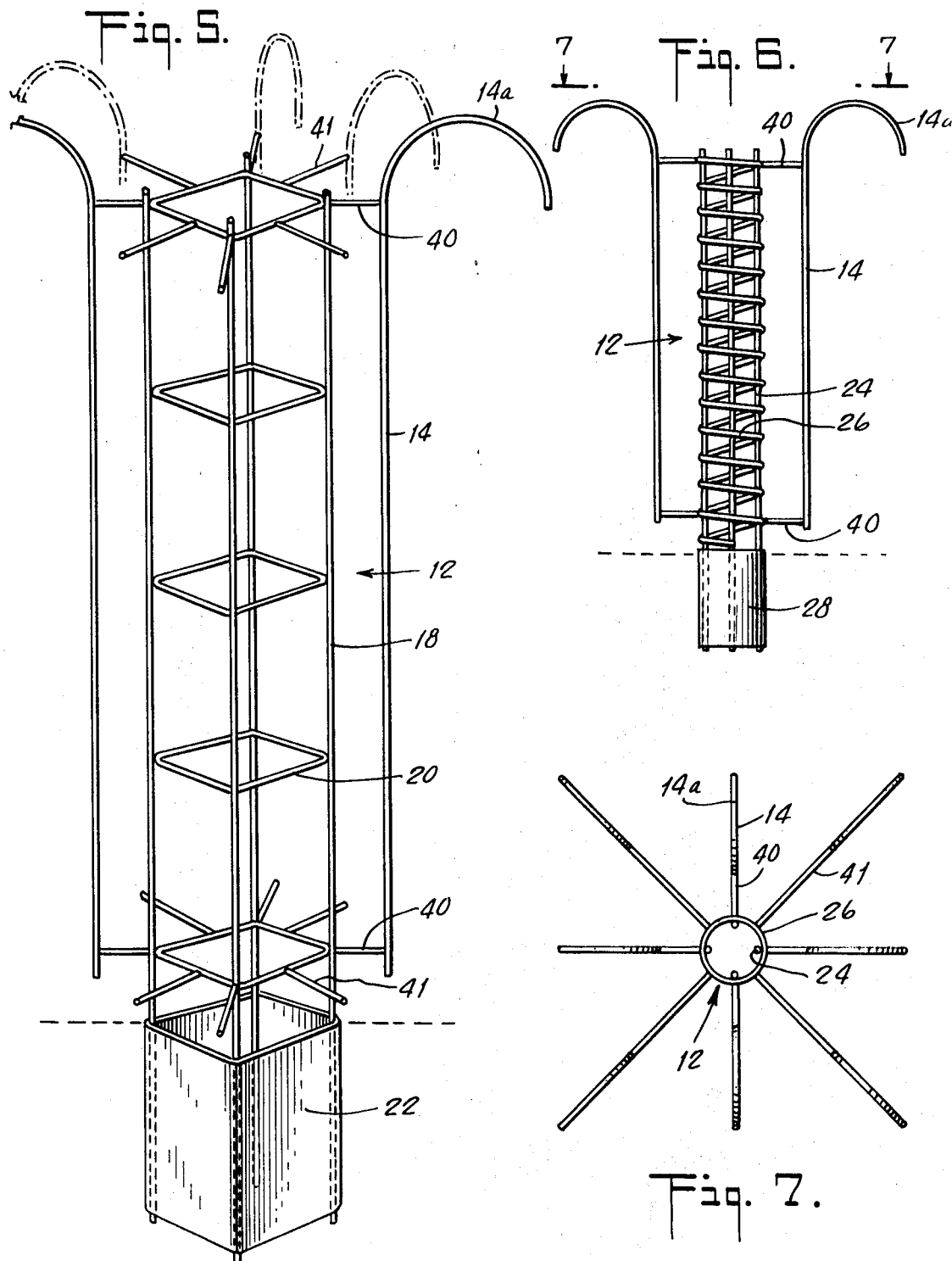

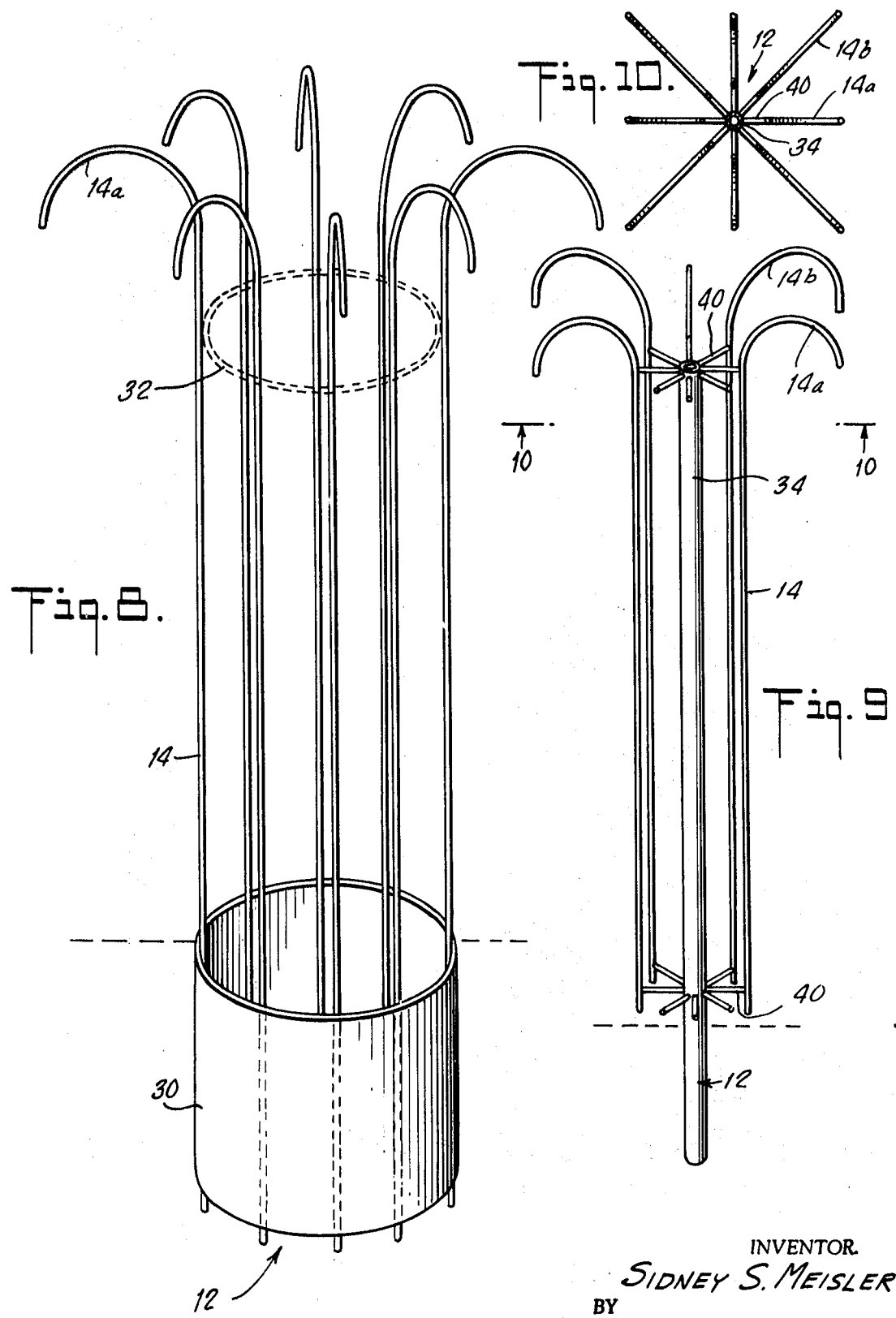

3,605,336
FRAME FOR GROWING HOPS OR THE LIKE
Sidney S. Meisler, 3702 Richey Road,
Yakima, Wash. 98902
Filed Mar. 24, 1969, Ser. No. 809,532
Int. Cl. A01g 17/06
U.S. Cl. 47—45
2 Claims

ABSTRACT OF THE DISCLOSURE

A frame for growing hops or the like comprises a number of standards disposed substantially perpendicular to the ground, the standards at their upper ends extending outwardly and preferably downwardly. As the vines grow upwardly on the standards, the vines reach the upper portion of the standards and continue their growth outwardly and downwardly, thus making the hops more readily harvestable. The frames may be arranged in a pattern conducive to mechanical treating and harvesting of the hops.

BACKGROUND OF THE INVENTION

This invention relates to hop growing or the like and to frames for same. More particularly, the present invention concerns a frame which allows the hop vine to grow upwardly while being supported to nearly its full height and then to be trained to grow outwardly and downwardly from the frame so that the hop cones may be easily picked.

Frames for supporting growing hop vines or the like are well-known. In general, the structures employed consist of an array of thin upright wooden poles with a network of interlinked wires or cords. The wooden poles are sometimes arranged to form a grid pattern having a distance between the poles of about 28 feet in all directions. However, a diamond array may also be employed. With either arrangement, the poles are connected at their upper ends by cables or wires. A series of bearing wires is then strung transversely upon the cables at 7-foot intervals. Both the cables and the bearing wires are disposed at a height of about 18 feet above the ground, and as the poles must be embedded in the ground for at least 2 to 3 feet to provide support, the length of the poles is about 21 feet. The border and corner poles are anchored by means of wires to concrete blocks buried in the ground nearby.

Between the bearing wires the hop vines are planted in a square grid with about 7 feet separating the plants. A wooden peg or metal clip is disposed in the ground near the root of each plant. From each peg or clip two training lines are strung to the bearing wires so that the training wires appear to form a V-pattern when viewed from eye level. These training lines may be iron wires, as are the cables and bearing wires, but preferably are fabricated from jute fiber, sisal, or intertwined paper strands treated with copper naphthenate.

Although such a system is relatively inexpensive, it is insecure against natural or man-made forces, e.g. storms, and requires extensive maintenance. It is common for the wire work to fall and to have to be restrung. Moreover, the training lines must be bound by expensive hand labor to the bearing wires. If wooden pegs are employed, they create an obstacle for the mechanical harvesting, dressing and cutting machines. If clips are employed to secure the wire work, they must be left in the ground and replaced each season. More importantly, it is difficult to pick the hops at a rapid pace without interfering with and damaging the wire work.

One frame has been devised to overcome some of these problems. This device comprises four upright poles joined together by cross-ties at their upper ends and a number of flexible rods which are secured in the ground at a distance from the upright poles and then bent so that their upper portions may be wastened to the nearest upright poles; see U.S. Pat. 75,474. Although this type frame is relatively stable and does not require extensive wire work, it is not adaptable to mechanical picking as the hops are disposed within the interior of the frame where they cannot be easily reached and consequently it is not known to be used anywhere in the hop growing industry.

SUMMARY OF THE INVENTION

An object of the invention is to provide a frame for growing hop vines or the like which has stability as an independent unit without requiring the support of a network of interlinking wires.

Another object of the invention is to provide a means for training a hop vine or the like to grow upwardly, outwardly and downwardly relative to a supporting structure so that the hop cones may be readily picked by mechanical means without interfering with the supporting structure.

To these and other ends, the present invention contemplates a frame for growing hops or the like including a support disposed in an upright position and a plurality of standards preferably curved outwardly and downwardly at their upper ends upon which the vines grow, the standards being connected to and disposed substantially parallel to the axis of the support. Thus the vines may be trained to grow outwardly and downwardly upon reaching the curved portions of the standards so that only the fruitful portion of the vines will be harvested.

In the apparatus of the invention, the support for the frame may be an upright wooden pole of a length appropriate for the particular vine to be grown and sufficiently long so that when embedded in the ground, it will stand upright under most natural and artificial conditions.

In modifications of the support structure, the support may be an upright metal tube; a number of parallel upright metal rods about which another rod is wound, the entire structure being encased at its lower end in a metal cylindrical base; a lattice of several parallel upright metal rods connected together by transverse rods and encased at the base in a metal cylinder; or a metal cylindrical base.

Standards are provided for direct support of the growing vines. These standards are desirably fabricated from metal rods, such as reinforcing rods, and are of a length appropriate for the particular vine to be grown. The standards are disposed substantially parallel to the axis of the support. At a point near the top of the frame, the standards are curved from the axis of the support outwardly and then downwardly.

The standards are in most of the embodiments associated with the support by transverse connecting rods. In the one embodiment where a metal cylindrical base alone forms the support, the standards are attached directly to the support but may be reinforced near their upper ends by a metal ring.

The vines are planted near the base of the frame or support structure such that a plurality of vines (e.g. two or three vines) will grow upwardly upon each standard until it reaches the curved portion of the standard. Thereafter, the vines are trained to follow the curved portions until the ends of the standards, whence they continue to grow downwardly. As the vines are defoliated before they have grown to the ends of the standards or the outwardly extending or curved portions thereof, the foliage and hop cones only appear on the portions of the vines extending beyond the support structure and/or growing downwardly from the ends of the upper curved portions of the standards. A mechanical harvester may then readily pick the hop cones as the harvester travels past the frames. Subsequently, the portions of the vines which remain on the frames may be burned or scored off.

The frames may be disposed in an array so that a mechanical harvester or other portable hop-harvesting equipment may move between rows of frames to perform its function on two parallel rows of frames simultaneously. Each frame is completely independent of every other frame so that storms or other forces cannot cause an entire array to collapse.

BRIEF DESCRIPTION OF THE DRAWINGS

FIG. 1 is a plan view of an array of six-standard frames in accordance with the invention for growing hops or the like;

FIG. 3 is an elevational view of an eight-standard frame in accordance with another embodiment of this invention;

FIG. 4 is a cross-sectional view taken along the line 4—4 of FIG. 3;

FIG. 5 is an elevational view of another embodiment of a frame of the present invention;

FIG. 6 is an elevational view of still another modification of frame of the invention;

FIG. 7 is a cross-sectional view taken along the line 7—7 of FIG. 6;

FIG. 8 is an elevational view of yet another embodiment of frame of the invention;

FIG. 9 is an elevational view of a further embodiment of the present invention; and FIG. 10 is a cross-sectional view taken along the line 10—10 of FIG. 9.

DETAILED DESCRIPTION

Figure 1:
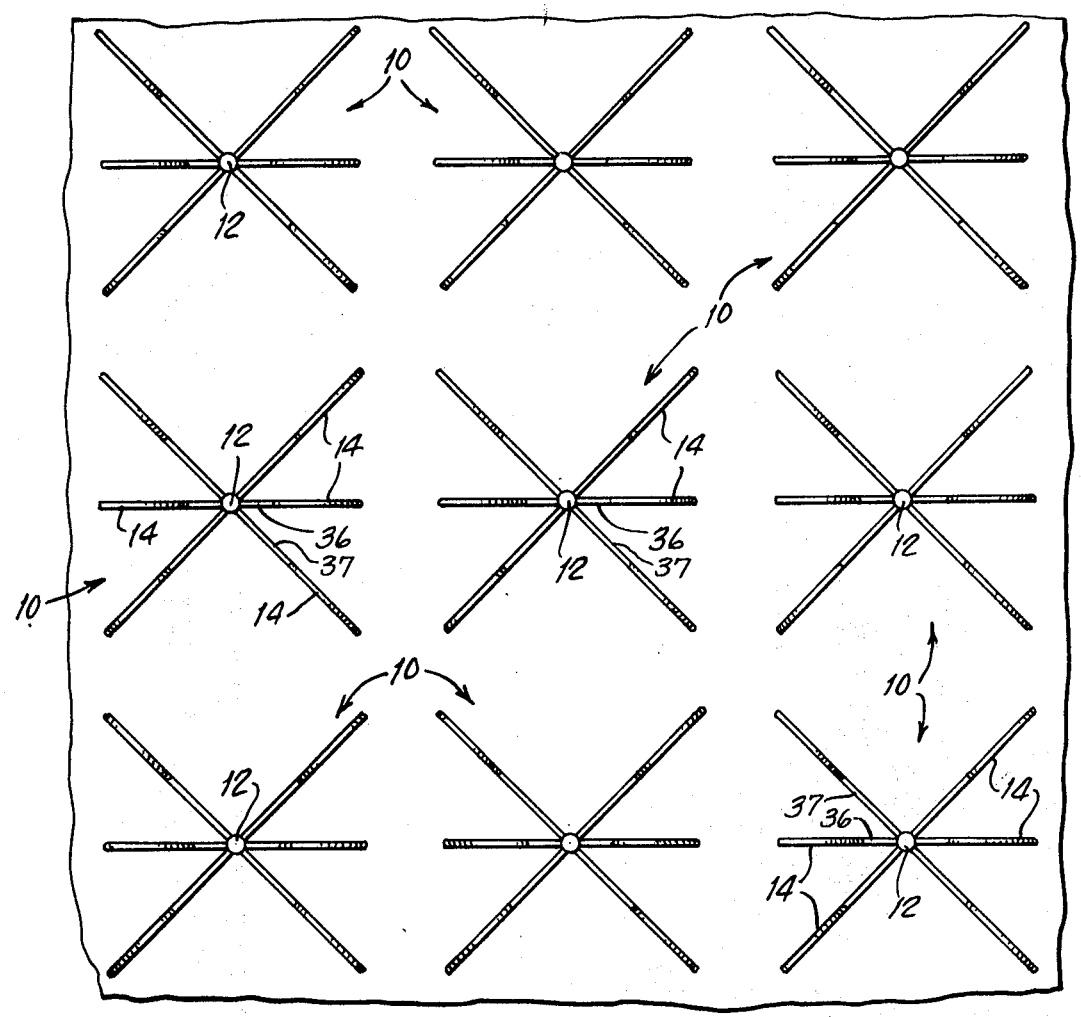
Figure 2:
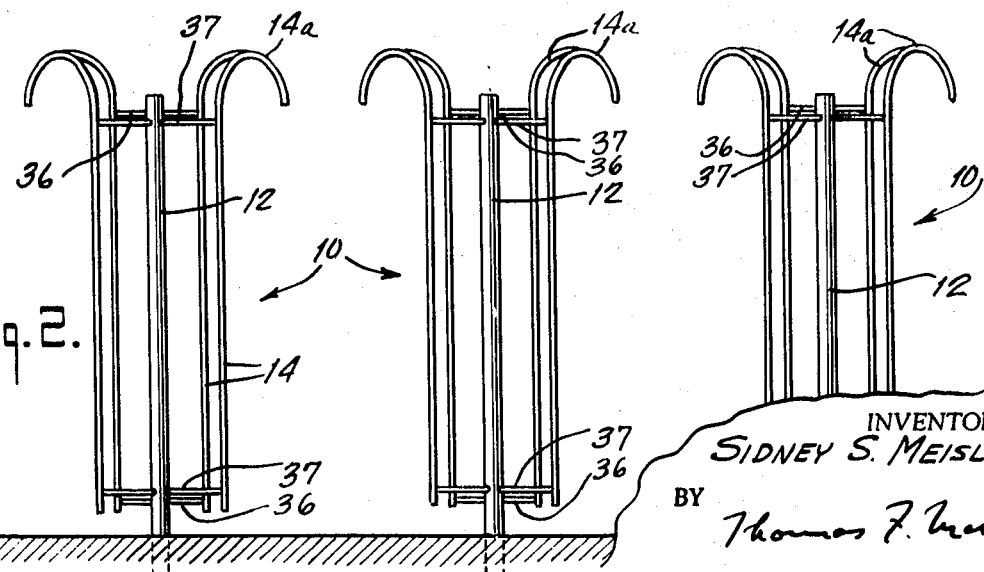
FIG. 2 is an elevational view of the array of frames illustrated in FIG. 1.

Referring to FIGS. 1 and 2 of the drawings, there is shown an array of frames 10 for growing hops or other vine plants, such as grapes, tomatoes, peas, or the like. Frames 10 are disposed in a grid pattern. Each individual frame 10 is independent of the other frames in the array and comprises a support 12 for maintaining the frame in an upright position and a plurality of standards 14 upon which the vines grow connected to and disposed substantially parallel to the axis of the support. Each standard 14 extends outwardly and downwardly at its upper end such that the vines which have grown upon the standards may be trained to grow outwardly and downwardly upon reaching the upper portions 14a or 14b of standards 14. As the length of the standards 14 may be chosen such that the hop cones first appear at that point on the vines where the vines have extended outwardly beyond the standards, the hop cones will extend downwardly from the ends of the standards so that only the useful portion of the hop vine need be harvested.

Support 12 for frame 10 is shown as a wooden pole 16 (FIGS. 3 and 4) of a length sufficient to be firmly embedded in the ground so as to maintain the stability of the frame under most natural and artificial conditions, e.g. storms, and of a height appropriate for the particular vine to be grown. A support having a height of about 16 ft. 6 in. to 21 ft. has been found to be desirable in most instances, about 3 ft. of that height being located beneath the surface. As wooden poles are commonly used in the present methods for growing hop vines, they are preferred for the present system so that the existing capital investment of hop growers need not be wasted.

In FIGS. 5 through 9, modifications of support 12 are illustrated. Thus, in FIG. 5, support 12 comprises a plurality of parallel upright metal rods 18 fastened together to form a lattice by a plurality of substantially transverse metal rods or rings 20, e.g. as by welding or the like. Transverse metal rods or rings 20 reinforce upright metal rods 18 at various points along their length. A metal cylindrical base 22 receives upright metal rods 18 at their lower ends in order to provide a firm and solid base for support 12, cylindrical base 22 being located entirely beneath the surface of the ground.

In the embodiment shown in FIGS. 6 and 7, support 12 comprises a plurality of parallel upright metal rods 24, similar to those shown in the embodiment of FIG. 5, about which an additional metal rod is coiled, coiled rod 26 being fastened e.g. as by welding to upright metal rods 24 in order to provide reinforcement. Again upright metal rods 24 are received at their lower ends within metal cylindrical base 28, similar to base 22 of FIG. 5, and are secured thereto e.g. by welding or the like. Cylindrical base 28 is located beneath the surface in order to provide a more firm support.

In FIG. 8, the entire support for standards 14 is metal cylindrical base 30 to which standards 14 are directly secured at their lower ends e.g. as by welding or the like. Again cylindrical base 30, which is similar to base 22 of FIG. 5 and base 28 of FIG. 6, is disposed entirely under ground. Metal ring 32 may be secured e.g. as by welding or the like to standards 14 near their upper ends so that frame 10 is reinforced against undesirable meteorological or artificial conditions, e.g. storms.

As a further modification of support 12 of the present invention, a metal tube or pipe 34, which may be either hollow or solid, may be employed (FIGS. 9 and 10). Tube or pipe 34 is similar in appearance to wooden pole 16 of the embodiment of FIG. 3, in that it provides firm support for frame 10 by merely being disposed in the ground without additional fabrication.

Standards 14, upon each of which at least one, and preferably two or three, hop vines or the like actually grows, are preferably metal rods, i.e. such as those ordinarily used for reinforcement of concrete, which are of an appropriate length for the particular vine to be grown. Although no specific number of standards 14 need be attached to any one support 12, and in some instances only one standard 14 may be desirable, it has been found that using six standards per frame produces an optimum yield as it allows each hop vine to obtain the needed sunshine and rain, while still remaining within reach of a mechanical harvester or other equipment for treating the hop vines. However, employing eight standards per support or frame is also satisfactory while allowing more vines to be grown per acre, i.e., 5280 vines/acre as opposed to 3960 vines/acre for frames having six standards when three vines are disposed on each standard 14. Standards 14 are disposed in frame 10 substantially parallel to the axis of support 12, the standards being of a height nearly equal to the height of a growing hop vine. At the ends of the upright portions of standards 14, the length of which portions being only determinable experimentally from a knowledge of soil, weather and other conditions, standards 14 are curved outwardly and downwardly from the axis of support 12 to form curved portions 14a resembling canes. However, in the embodiment shown in FIGS. 9 and 10, some of standards 14 are curved more extensively to form curved portions 14b, so that the hop cones are disposed along a line parallel to the path of the traveling mechanical harvesters.

In the embodiment shown in FIGS. 3 and 4, transverse connecting rods 36 and 37, fabricated of the some material as standards 14, secure standards 14 to wooden pole 16 which serves as support 12. In the preferred manner, a plurality of apertures 38 are drilled in the wooden pole 16 near the upper and lower ends of the pole and transverse connecting rods 36 and 37 are disposed entirely through apertures 38 in wooden pole 16 so that each transverse connecting rod 36 or 37 is directly fastened as by welding or the like to two standards 14 at opposing sides of support 12. Transverse connecting rods 37 are longer than rods 36 so that standards 14 and hence the hop cones growing thereon may be located parallel to the harvesters moving between the rows of frames 10. In the modifications of the invention shown in FIGS. 5, 6, 7, 9 and 10 transverse connecting rods 40 and 41 emanate radially from support 12 and are fastened directly thereto at one end and to standards 14 at the other end e.g. as by welding or the like; again transverse connecting rods 41 are longer than rods 40 (in FIGS. 5, 6 and 7) so that standards 14 may be arranged in parallel rows. It should be noted that in all of the preferred embodiments of the invention, standards 14 are arranged such that hop cones 44 are disposed axially parallel to the paths left between frames 10, irrespective of whether there are six or eight standards per frame. However, in the embodiment shown in FIG. 8, no transverse connecting rods are needed as standards 14 are attached directly as by welding or the like to cylindrical base 30 which serves as support 12.

In accordance with the present invention, vines 42 may be planted near the base of frame 10 (as shown in FIGS. 3 and 4) such that a plurality of vines 42 will grow upwardly upon the nearest standard 14. During the growth of vines 42 vertically upward on standard 14, vines 42 will become entangled with and surround standard 14. As vines 42 grow toward the end of the upright or straight portion of standard 14, vines 42 are defoliated in a known manner. Thereafter, vines 42 grow substantially outwardly and downwardly. If standard 14 is of the proper length, hop cones 44 should begin to appear on vines 42 during their downward growth from the end of standard 14. Thus a mechanical harvester passing between rows of frames 10 may readily pick hop cones 44 simultaneously from two frames 10 on opposing sides of the harvester by merely cutting vines 42 at a point below the end of curved portion 14a or 14b of standard 14.

Thus, the present invention provides a desirable apparatus and technique for growing hop vines or the like wherein each of the structures is independent of the other structures of the array and mechanical treating and harvesting of the vines may be readily accomplished.

I claim:
1. A frame for growing hops or the like comprising a single, substantially rectilinear support means disposed in an upright position, a plurality of substantially rectilinear upright standards separate from and spaced from but fixed to and disposed in spaced parallel relationship with respect to and uniformly about and along the length of said support means, said standards being disposed uniformly radially about said support means and being fixed to said support means by rods carried by said support means and fixed at one end to a standard, said standards being fixed to said support means only by said rods, said rods being disposed transversely with respect to said support means and to said upright standards, each of said standards at its upper end portion being disposed curvedly upwardly, outwardly and downwardly.

2. A frame in accordance with claim 1 wherein each of said rods connecting and fixing said standards to said support means is disposed transversely through said support means and fixed at its ends to diametrically opposed standards.

References Cited

UNITED STATES PATENTS

| | | | |
|---|---|---|---|
| 154,155 | 8/1874 | Setchell | 47—47 |
| 1,083,450 | 1/1914 | Lytle | 47—47 |
| 2,725,676 | 12/1955 | Pucci | 47—47 |
| 3,391,491 | 7/1968 | Daly | 47—46 |

ROBERT E. BAGWILL, Primary Examiner

U.S. Cl. X.R.

248—351